Patented Apr. 28, 1953

2,636,896

UNITED STATES PATENT OFFICE 2,636,896

ORGANOSILOXANES CONTAINING TRIFLUOROMETHYLPHENYL GROUPS

Lawrence W. Frost, Pittsburgh, Pa., assignor to Westinghouse Electric Corporation, East Pittsburgh, Pa., a corporation of Pennsylvania No Drawing. Application September 29, 1949, Serial No. 118,718

6 Claims. (Cl. 260—448.2)

This invention relates to organosilicon compounds containing fluorine and in particular organosilicon compounds containing polyfluoro organic substituents attached to silicon.

This application is a continuation in part of my copending application Serial No. 751,964, filed June 2, 1947, now abandoned.

The object of this invention is to prepare organosilicon compounds containing polyfluoro organic substituents attached to silicon.

Another object is to provide methods for introducing polyfluoro organic groups into organosilicon compounds.

A further object of the invention is to provide siloxanes in which trifluoromethyl substituted phenyl radicals are attached to silicon.

A still further object of the invention is to provide for heat hardenable polysiloxane resins containing trifluoromethyl radicals attached to silicon through intervening carbon groups.

Other objects of the invention will in part be obvious and will in part appear hereinafter.

The present invention is based on the discovery that polyfluoro organic substituents may be attached by hydrocarbonsilicon linkages to silicon in organosilicon compounds. These compounds, if provided with a hydrolyzable group, may be subsequently treated to produce polysiloxanes in which polyfluoro organic groups are attached to silicon by carbonsilicon linkages. A number of methods may be employed in introducing the polyfluoro organic substituents into organosilicon compounds. One effective method is to prepare chlorosilanes and to treat such chlorosilanes by means of a fluorinating agent to replace chlorine with fluorine. The following general processes are exemplary.

1. $[R(CCl_3)]_xSiCl_{(4-x)} + SbF_3 \rightarrow [R(CF_3)]_xSiF_{(4-x)} + SbCl_3$
2. $[R(CCl_3)]_xSiCl_{(4-x)} + HF \rightarrow [R(CF_3)]_xSiF_{(4-x)} + HCl$ R is a phenylene group and $x$ has a value of from 1 to 3. In a second method, trifluoromethylphenyl radicals may be introduced by means of a Grignard reagent into silicon esters or halides. The following equations exemplify this method:

3. $R(CF_3)Br + Mg \xrightarrow{\text{(ether)}} R(CF_3)MgBr$
4. $Si(OC_2H_5)_4 + xR(CF_3)MgBr \rightarrow [R(CF_3)]_xSi(OC_2H_5)_{(4-x)} + xMgBrOC_2H_5$ R is a phenylene radical. In the above equations 3 and 4, the bromine attached to the phenylene radical may be replaced with chlorine or iodine.

Fluorine-containing organosilicon compounds produced as disclosed herein, which also contain a hydrolyzable group, for example, a halide or alkoxy group, attached to silicon, may be subsequently subjected to hydrolysis and polymerization with formation of either fluid or solid polyfluoropolysiloxanes. In some cases the fluorine-containing organosilicon compounds may be condensed with other organosilicon compounds thereby producing interpolymer compounds containing polyfluoro organic groups in predetermined proportions. The hydrolyzable polyfluorosilicon compounds or their low polymers behave in many respects much as do non-fluorine containing conventional organosilicon compounds with regard to hydrolysis and condensation reactions. However, the polymers have certain other distinctive properties which render them highly useful. One outstanding characteristic appears to be a greatly improved thermal resistance possessed by the siloxane polymers and copolymers containing a plurality of fluorine atoms attached to carbon. Thus, films of the polyfluorosiloxanes will withstand higher temperatures, other conditions being equal, than non-fluorine-containing polysiloxanes. In many cases the solid fluorine-containing polysiloxanes are harder and tougher. Other advantages of the fluorine-containing polysiloxanes as well as the intermediates will be described hereinafter.

More specifically, my invention comprises the preparation of hydrolyzable silanes having attached to silicon from 1 to 3 substituted phenyl groups wherein the substituents comprise one or more trifluoromethyl radicals. The trifluoromethyl groups may be substituted ortho, meta or para on the phenyl groups. Two or three trifluoromethyl groups may be attached to the phenyl radicals in various positions. Silanes may be readily prepared with several different substituted phenyl radicals attached to the central silicon atom, some of the phenyl groups being provided with one, others with two or three trifluoromethyl groups attached in substantially any position on the phenyl radical. Mixed silanes, comprising a mono(trifluoromethyl)phenylsilane and a bis(trifluoromethyl)phenylsilane or tris(trifluoromethyl)phenylsilane may be produced. Such compositions comprise at least one compound having the formula

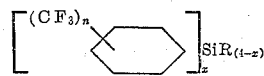

where R represents a hydrolyzable monovalent radical selected from the group consisting of chlorine, fluorine and alkoxy radicals, and $n$ and $x$ each represents a number from 1 to 3.

The silanes may include phenyl or methyl groups or both attached directly to silicon in conjunction with trifluoromethylphenyl radicals also attached to silicon. Likewise, it is a feature of the invention to prepare silicon compounds wherein a trifluoromethylphenyl group is attached to one silicon atom and an alkyl, aryl, cycloalkyl, alkaryl or other monovalent organic group is attached to another silicon atom connected to the first silicon atom by an oxygen linkage. Examples of such monovalent radicals are methyl, ethyl, propyl, isobutyl, octyl, dodecyl, cyclohexyl, allyl, methallyl, phenyl, tolyl, xylyl and naphthyl radicals. Examples of hydrolyzable radicals that may be attached directly to silicon are chlorine, bromine, fluorine, methoxy, ethoxy, and propoxy.

In order that those skilled in the art may better understand the invention, the following specific examples are given.

EXAMPLE I

*Preparation of 3-(trifluoromethyl)phenylsilanes*

The preparation of (trifluoromethyl)phenylethoxysilanes was accomplished as follows: A solution of 255 g. of 3-bromo-(trifluoromethyl)-benzene in 200 ml. of absolute ether was added slowly to 25 g. of finely divided magnesium metal, 100 ml. of absolute ether and a crystal of iodine, all within a closed reaction vessel provided with a reflux column. The mixture was slightly heated to initiate reaction. Once started, the reaction proceeded readily and maintained a steady reflux without external heating. When the addition was complete, the solution was diluted to a total volume of 1 liter with anhydrous ether. The clear solution was then added slowly with stirring to 166.4 g. of ethyl orthosilicate. The mixture was refluxed during the addition and for ½ hr. thereafter. The mixture was then distilled to remove ether; toward the end of the distillation, benzene was added to enable the removal of the last of the ether. The remaining liquid was filtered to remove salts and the salts were washed thoroughly with benzene. The washings and the filtrate were combined and fractionally distilled. The resulting fractional distillation produced 43 g. of ethyl orthosilicate, 39.5 g. of 3-(trifluoromethyl)phenyltriethoxysilane (B. P. 86.5° C. to 87.5° C. at 4 mm.), 46.5 g. of bis[3-(trifluoromethyl)phenyl] diethoxysilane (boiling point 104° C. to 115° C. at 1 mm.), and 14 g. of a higher boiling-point liquid which appeared to be a mixture of the tri- and tetra-substituted trifluoromethylphenyl silicon compounds.

EXAMPLE II

*Bis[3-(trifluoromethyl)phenyl]siloxanes*

The bis[3-(trifluoromethyl)phenyl]diethoxysilane from Example I was purified by repeated crystallization at low temperatures. A white crystalline material, melting at 20° C., was obtained. A portion, comprising 4.3 g., of the white crystalline material was boiled for 3 hours with a mixture composed of 10 ml. each of toluene, water, concentrated hydrochloric acid and 95% ethanol to hydrolyze it. A non-aqueous layer which carried the silicon compound was decanted. The organic layer was washed twice with water and then heated for 15 hours at 110° C. to drive off the volatiles. An oil remained after this treatment. After further heating at 250° C. for 2½ hours, the product increased in viscosity considerably but still was an oily fluid in an amount of 3 g. The composition of the oil was determined to be:

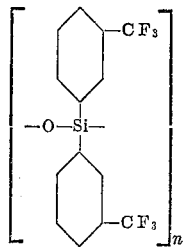

where $n$ had a value greater than 10, and the trifluoromethyl groups were in the meta position. Both cyclic and linear oily polymers are formed. Low viscosity fluids with the above formula result where $n$ is 4 or higher. In the linear polymers the chains terminate in silicon atoms with three monovalent substituent groups. The three monovalent groups may be trifluoromethylphenyl radicals.

EXAMPLE III

*Siloxane copolymers of 3-(trifluoromethyl)-phenylsilanes*

A siloxane copolymer of the product of Example I was prepared as follows: A mixture composed of 2.643 g. of methyltriethoxysilane, 2.169 g. of dimethyldiethoxysilane, 2.264 g. of 3-(trifluoromethyl) phenyl triethoxysilane and 3.041 g. of bis[3-(trifluoromethyl)phenyl] diethoxysilane was dissolved in 25 ml. of toluene. The solution so produced was added slowly with stirring to 50 ml. of 5% sulfuric acid. After the mixture was stirred and refluxed for 3 hours, the organic layer was separated, washed with water several times and then added slowly to 50 ml. of 40% sulfuric acid. The mixture was stirred at room temperature for 2½ hours and then allowed to stand to permit an organic layer to separate out. The organic layer was decanted, washed out with barium hydroxide solution followed by washing in water, and then dried over sodium sulfate. The relatively anhydrous solution so produced was transferred to an aluminum dish and heated at 175° C. for 5 hours. A light yellow, flexible film, approximately 1/25 of an inch thick, was formed at the bottom of the aluminum dish. It was heated in contact with the atmosphere for 8½ hours at 250° C. before any cracking of the film was apparent. A similar copolymer having a similar proportion of phenyl groups in place of the (trifluoromethyl)-phenyl groups, prepared in the same way and of the same thickness cracked after 5 hours at 175° C. The thermal stability of the copolymer containing trifluoromethyl groups substituted on phenyl was markedly superior to that of the copolymer having no trifluoromethyl groups.

EXAMPLE IV

*Preparation of 4-(trifluoromethyl)phenylsilanes*

492 parts by weight of liquid 4-methylphenyltrichlorosilane was exposed to actinic light while dry chlorine was bubbled therethrough. After an induction period, hydrogen chloride was evolved and the liquid became colorless. During the chlorination, the temperature of the liquid rose exothermally to 65° C., and chlorine was added at a rate to keep the product at this temperature over a period of 8 hours. Thereafter, the temperature was raised to between 90° C. and 100° C., and chlorination was continued at this temperature for an additional 18 hours. When the resulting reaction product was cooled to room temperature, it solidified. The resulting crude 4-(trichloromethyl)phenyltrichlorosilane so produced weighed 691 parts. A portion of the product was recrystallized from anhydrous ethyl ether twice to produce a substantially pure silane which was in the form of colorless needles having a melting point of 67.5 to 68° C.

A mixture of 99 parts of the crude 4-(trichloromethyl)phenyltrichlorosilane and 23 parts of antimony pentachloride was stirred rapidly while 127 parts by weight of powdered antimony trifluoride was added thereto slowly. Heat was evolved during the addition. After all of the antimony fluoride had been added, the mixture was heated to a higher temperature and a distillate fraction comprising 51 parts by weight of a colorless liquid product was obtained which on being subjected to redistillation produced relatively pure 4-(trifluoromethyl)phenyltrifluorosilane boiling over a 2° C. range. On further purification, a sample of this last distillate was found to have the following physical constants: boiling point 118.7° C.; melting point −3 to −4° C.; $n_D^{25}$ 1.3783; and $d_4^{25}$ 1.399.

Other fluorinating agents may be used in this process to replace chlorine with fluorine, these include hydrogen fluoride cobalt fluoride and silver difluoride.

EXAMPLE V

*Preparation of 3-(trifluoromethyl)phenylchlorosilanes*

A solution of 225 parts by weight of 3-bromo-(trifluoromethyl)benzene dissolved in 180 parts by weight of anhydrous ethyl ether was added slowly, with vigorous stirring, to 24 parts by weight of magnesium turnings. The magnesium dissolved in the solution to produce a dark brown solution of Grignard reagent. This reagent was added to 340 parts by weight of tetrachlorosilane dissolved in 180 parts of anhydrous ether. The reaction flask was cooled in an ice bath during the addition of the Grignard reagent. The reaction mixture was refluxed with rapid stirring for 9 hours. After this period, the liquid was permitted to stand until the salts which had formed had settled and then the liquid was decanted. The salts were washed twice with toluene, and the washings were added to the liquid previously decanted. The liquid mixture was then fractionally distilled to remove the ether, unreacted silicon tetrachloride and toluene. The residue was rectified at a reduced pressure producing 62 parts by weight of 3-(trifluoromethyl)phenyltrichlorosilane having a boiling point of 98° C. at 30 mm., and 46 parts of bis[3-(trifluoromethyl)-phenyl] dichlorosilane having a boiling point of 130° C. at 3 mm.

EXAMPLE VI

*Preparation of 3-(trifluoromethyl)phenyltrifluorosilane*

A mixture of 203 parts by weight of 3-(trifluoromethyl)phenyltrichlorosilane, from the preceding example, and 160 parts by weight of powdered antimony trifluoride was stirred and warmed gently to reflux which was maintained for ½ hour. After refluxing, the mixture was fractionally distilled to produce a liquid product boiling at from 113° C. to 118° C. The product weighed 153 parts by weight. By additional fractional distillation, a purified sample of 3-(trifluoromethyl)phenyltrifluorosilane was secured. Its physical constants were: boiling point 118.2° C.; melting point −34° C.; $n_D^{25}$ 1.3783; and $d_4^{25}$ 1.3985.

Other fluorinating agents capable of replacing chlorine with fluorine may be substituted for the antimony trifluoride, and examples of these are silver fluoride, hydrogen fluoride, bromine fluoride and cobalt fluoride.

EXAMPLE VII

*Preparation of 2-(trifluoromethyl)phenyl-dimethylchlorosilane*

A solution of 5 moles of n-butyllithium in 3 liters of anhydrous ethyl ether was prepared, and to this solution was added 584 grams of dry trifluoromethylbenzene. The mixture was stirred at room temperature for two hours and then refluxed gently with stirring for 16 additional hours. The resultant slurry was added slowly with stirring to 645 grams of dimethyldichlorosilane. The resulting mixture was refluxed with stirring for two hours and then filtered to remove the salts. The filtrate was distilled at atmospheric pressure to remove ether and unreacted dimethyldichlorosilane. Distillation was then continued at a reduced pressure to produce a fraction comprising 135 milliliters of crude 2-(trifluoromethyl)phenyldimethylchlorosilane. Upon redistillation to give a relatively pure product, the compound was found to have a boiling point of 78° C. at 12 mm.

The process of this Example VII may be carried out by substituting other dichlorosilanes for the dimethyldichlorosilane. Thus phenyl-methyl dichlorosilane, diphenyldichlorosilane and other dialkyl-, diaryl- and arylalkyl-, dichlorosilanes may be substituted in whole or in part for the dimethyldichlorosilane. There will result silanes with one trifluoromethyl phenyl radical and two non-fluorinated radicals attached to a common silicon atom.

EXAMPLE VIII

*Hydrolysis of (trifluoromethyl)phenyl-trifluorosilanes*

The (trifluoromethyl)phenyltrifluorosilanes of Examples IV and VI were each hydrolyzed in the following manner. An 0.038 mole sample of the silane was dissolved in 50 milliliters of toluene. The solution was added slowly to a well stirred refluxing mixture comprising 50 milliliters of water, 50 milliliters of 95% ethanol and 10 milliliters of concentrated hydrochloric acid. The mixture was stirred and refluxed for an additional 18 minutes after combination. The mixture was then agitated with 100 milliliters of water and then permitted to separate into two layers. The non-aqueous layer was decanted and placed in an oven at a temperature of 100° C. for 16 hours to evaporate the organic solvent. An oily residue resulted which was then heated at 200° C. The product derived from 4-(trifluoromethyl)phenyltrifluorosilane was converted to a hard brittle solid in 5 hours. It was soluble in toluene but became insoluble after further heating at 200° C. The product from the hydrolysis of 3-(trifluoromethyl)phenyltrifluorosilane was converted only to a soft thermoplastic material even after heating for 24 hours at 200° C. Further heating caused the product to harden slowly. However, it was still completely soluble in cold toluene after 1325 hours baking at 200° C.

EXAMPLE IX

Hydrolysis of 3-(trifluoromethyl)phenyltrichlorosilane

Following the procedure of the previous example, samples of 3-(trifluoromethyl)phenyltrichlorosilane were hydrolyzed and condensed. The product produced after the preliminary baking for 16 hours at 100° C. was a soft solid resin body which was tack-free at room temperature. After an additional baking for 24 hours at 200° C., the siloxane resin had become much harder and was somewhat brittle. It dissolved in toluene.

Mixtures of any two or all three of the mono-(trifluoromethyl)phenylsilanes in which the trifluoromethyl group is ortho, meta and para to the silicon atom and the remaining valences of the silicon atom are satisfied by hydrolyzable groups, may be hydrolyzed and condensed as set forth in Example VIII, to produce resinous siloxanes.

EXAMPLE X

Hydrolysis of bis[3-(trifluoromethyl)phenyl]dichlorosilane

A solution of 62 grams of bis[3-(trifluoromethyl)phenyl] dichlorosilane in 50 milliliters of toluene was added slowly to a well stirred refluxing mixture comprising 50 milliliters of water, 50 milliliters of 95% ethanol and 10 milliliters of concentrated hydrochloric acid. The mixture was refluxed with stirring for 1 hour after which the mixture was permitted to stand and form two layers. The non-aqueous layer was removed and washed with water. The non-aqueous layer was then stirred for 1 hour at room temperature with 150 milliliters of 50% sulphuric acid. After standing, the organic layer, which formed, was separated and washed, first with a sodium bicarbonate solution and then with distilled water. The washed organic solution was filtered and then placed in an oven at 100° C. for 64 hours to drive off the organic solvent. The oily siloxane resulting was transferred to an oven at 200° C. for 1 hour. The product consisted of 49 grams of a light yellow oil. Further baking at 200° C. for 72 hours while exposed to the atmosphere produced no further apparent change except for a slight increase in viscosity. The formula for the product was similar to that shown in Example II.

Similar oils resulted when the bis[2-(trifluoromethyl)phenyl] silane and bis[4-(trifluoromethyl)phenyl]silanes with two hydrolyzable substituents on each silicon atom were hydrolyzed and condensed. Mixtures of these compounds having the trifluoromethyl groups in various positions on the two substituted phenyl groups on each silicon atom will produce stable fluids.

In a similar manner to that set forth in Example IV, xylylchlorosilanes may be chlorinated to replace the hydrogen atoms on the methyl groups in the xylyl radical and then fluorinated to produce bis(trifluoromethyl)phenylfluorosilanes which may be hydrolyzed and condensed by the procedure of Example VIII into a polyfluoropolysiloxane. From one to three bis(trifluoromethyl)phenyl groups may be attached to a silicon atom.

Depending upon their structure, the fluorine-containing organo-polysiloxanes may be in the form of fluids or solids. The stable fluids will be found to be non-cross-linked cyclic or linear structures, or a mixture of both, containing on the average approximately two organic groups, preferably substituted phenyl groups with at least one trifluoromethyl substituent, directly connected to each silicon atom, the other silicon bonds being connected to oxygen. In case of linear structures, the fluids may have a terminal structure wherein three monovalent, non-hydrolyzable, organic groups are connected to the last silicon atom. By proper reaction conditions, fluids may be secured with a wide range of viscosities. By fractional distillation of such fluids, fractions of almost any required viscosity may be obtained. The viscosity-temperature curves of the fluids are much flatter than those of ordinary petroleum lubricants. The polyfluorosiloxane fluids may be employed as lubricants, hydraulic fluids, sealing compounds for plug cocks and heat transfer fluids. They may be used as fluid dielectrics. Their thermal and chemical stability render them highly suitable for these and other applications.

Cross-linked polysiloxanes containing polyfluoro organic groups may be prepared and employed in various capacities. They will average from one to less than two organic substituents per silicon atom. When incompletely condensed, they are liquids or gels that may be hardened by heat treatment and the addition of catalysts into solids varying from rubbery to hard, brittle bodies. The solidifiable compositions may be employed for electrical insulation, as paints, coating compositions, bonding agents for mica flakes and for metal, and the like. For any given application a suitable hardenable composition may be selected. Usually, a low polymer or incompletely condensed siloxane in a solvent soluble stage is employed for application to a base member and is cured to a final hard solid condition after being applied and the solvent driven off. The partially condensed polyfluoropolysiloxane may be dissolved in organic solvents such as toluene, xylene or the like, to a suitable viscosity fluid so as to be readily applied to members. Alternatively, the siloxane may be admixed while in a fluid or gelatinous state with various fillers such, for example, as powdered inorganic solids or fine fibers such as glass fibers and asbestos, carbon, iron oxide, silica and the like, and molded into members and cured under heat to a solid state. Laminates or other bodies reinforced with asbestos or glass fiber fabrics can be made from polyfluorosiloxanes. To enable curing to a solid state, the intermediate siloxanes may be admixed with catalysts, particularly organometal compounds of monovalent organic acids commonly used as driers, such for example as lead octoate, lead naphthenate and cobalt linoleate, and then heat-treated.

Numerous other uses of the invention will be obvious to those skilled in the art, and it is desired that the specification be interpreted as illustrative and not in a limiting sense.

I claim as my invention:

1. A fluorosiloxane having the general formula:

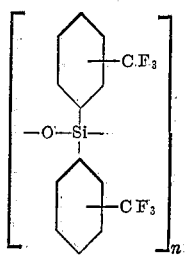

where $n$ has a value greater than 10.

2. A fluid fluorosiloxane having the general formula:

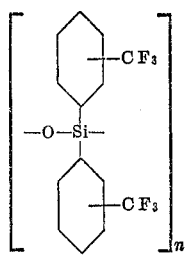

where $n$ has a value greater than 3.

3. A siloxane polymer comprising the recurring structural unit $(C_6H_4CF_3)_2SiO$.

4. An organosiloxane polymer having the recurring group

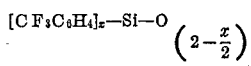

where $x$ is a number from 1 to 2.

5. A siloxane copolymer having Si—O—Si linkages and with organic groups attached to the silicon atoms by carbon silicon linkages, the organic groups attached to a portion of the silicon atoms consisting of $CF_3C_6H_4$ groups, while the organic groups attached to the remaining silicon atoms consist of a radical selected from at least one of the group consisting of methyl and phenyl radicals.

6. A siloxane copolymer having Si—O—Si linkages and with organic groups attached to the silicon atoms by carbon silicon linkages, the organic groups attached to a portion of the silicon atoms consisting of $CF_3C_6H_4$ groups, while the organic groups attached to the remaining silicon atoms consist of monovalent hydrocarbon radicals.

LAWRENCE W. FROST.

References Cited in the file of this patent

McBee et al., Industrial and Engineering Chem., vol. 39, No. 3, March 1947.